United States Patent [19]

Wheatley et al.

[11] 4,383,297

[45] May 10, 1983

[54] DATA PROCESSING SYSTEM INCLUDING INTERNAL REGISTER ADDRESSING ARRANGEMENTS

[75] Inventors: Nigel J. Wheatley, Broadstone; Martyn P. Andrews, Taplow, both of England

[73] Assignee: Plessey Overseas Limited, Ilford, England

[21] Appl. No.: 191,850

[22] Filed: Sep. 29, 1980

[30] Foreign Application Priority Data

Sep. 29, 1979 [GB] United Kingdom ............... 7933858

[51] Int. Cl.³ .......................................... G06F 13/00
[52] U.S. Cl. ................................................ 364/200
[58] Field of Search ............................. 364/200, 900

[56] References Cited

U.S. PATENT DOCUMENTS 3,614,741 10/1971 McFarland, Jr. .................... 364/200
3,854,126 12/1974 Gray et al. ........................... 364/200
4,194,241 3/1980 Mager ................................. 364/200

FOREIGN PATENT DOCUMENTS 1394431 5/1975 United Kingdom .
1405334 9/1975 United Kingdom .
1461245 1/1977 United Kingdom .
1474385 5/1977 United Kingdom .
1493792 11/1977 United Kingdom .
1538023 1/1979 United Kingdom .

Primary Examiner—James D. Thomas
Assistant Examiner—David Y. Eng
Attorney, Agent, or Firm—Fleit, Jacobson & Cohn

[57] ABSTRACT

In a multi-processor system of the type in which each processor is provided with its own unique bus which has an addressing system organized in such a manner that all store locations and peripheral equipments are addressed as part of a comprehensive single addressing system. Each address comprises a module number and an offset address. Each module in the system includes a module number comparator which detects the presence of its module address on a CPU bus and allows the offset address to be active within that module. The invention provides for the incorporation of similar mechanisms within a CPU allowing the CPU to address its own internal registers in an identical manner to its normal bus addressing mode. In addition the offset address includes a "bit portion address" which selects a mask which is used when performing the required internal register operation. The main advantage of such an arrangement is the simplification of the instruction range for the CPU as "normal" instructions may be used to manipulate the internal registers rather than having special purpose instructions dedicated to the manipulating of the registers.

4 Claims, 6 Drawing Figures

| ADDRESS | | | | | | | | | | | | REGISTER | ACCESS |
|---|---|---|---|---|---|---|---|---|---|---|---|---|---|
| 11 | 10 | 9 | 8 | 7 | 6 | 5 | 4 | 3 | 2 | 1 | 0 | | |
| 1 | 0 | 0 | 0 | 0 | 0 | 0 | 0 | 0 | 0 | 0 | 0 | INTERRUPT ACCEPT (IR) | R/W – |
| 0 | 1 | 0 | 0 | 0 | 0 | 0 | 0 | 0 | 0 | 0 | 0 | C (S) BASE | R/W(12ms bits) |
| 0 | 0 | 1 | 0 | 0 | 0 | 0 | 0 | 0 | 0 | 0 | 0 | FAULT INDICATORS (FIR) | R/W |
| 0 | 0 | 0 | 1 | 0 | 0 | 0 | X | X | X | X | X | PRIMARY INDICATORS (PIR) | R/W |
| 0 | 0 | 0 | 0 | 1 | 0 | 0 | 0 | 0 | 0 | 0 | 0 | HISTORICAL (HR) | R |
| 0 | 0 | 0 | 0 | 0 | 1 | 0 | X | X | X | X | 0 | CAPABILITY BASE C(X)B | R |
| 0 | 0 | 0 | 0 | 0 | 1 | 0 | X | X | X | X | 1 | CAPABILITY LIMIT C(X)L | R |
| 0 | 0 | 0 | 0 | 0 | 0 | 1 | X | X | X | X | 0 | DATA (D (X)) | R/W |
| 0 | 0 | 0 | 0 | 0 | 0 | 1 | X | X | X | X | 1 | POINTER (P (X)) | R/W |
| 0 | 0 | 1 | 0 | 0 | 0 | 0 | 0 | 0 | 0 | 0 | 1 | TEST (TR) | |
Fig. 5
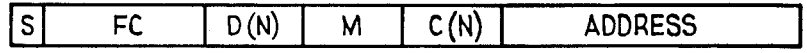
| S | FC | D(N) | M | C(N) | ADDRESS |
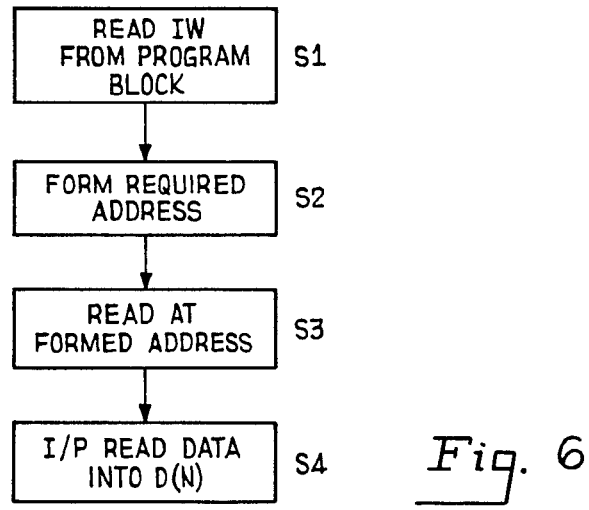
Fig. 6

DATA PROCESSING SYSTEM INCLUDING INTERNAL REGISTER ADDRESSING ARRANGEMENTS

BACKGROUND OF THE INVENTION

1. Field of Invention

The present invention relates to data processing systems and is more particularly concerned with the addressing of internal registers in the central processing units (CPU's) of such systems.

2. Discussion of Prior Art

In B.P. No. 1,394,431 there is provided a multiprocessor system in which each CPU is provided with an individual bus to provide access to information held in storage locations and peripheral equipments using a comprehensive single addressing system. In such an arrangement each address comprises a module number which specifies the module (i.e. store module or peripheral equipment) and an offset address used to define the required location within the module.

It is an aim of the present invention to extend the addressing system so that normal addressing instructions are used to access internal registers.

SUMMARY

According to the invention there is provided a data processing system of the type including one or more processing units, a plurality of storage modules and a plurality of peripheral equipments and each storage module and each peripheral equipment is provided with an access unit and each processing unit is provided with its own unique data communication path which is connected to an individual port on each access unit and each access unit is conditioned with the system identity of the equipment it serves and each access unit includes an identity address recognition arrangement and processing unit access to a peripheral equipment or a storage module location is performed by the processing unit extending to its own communication path an address comprising at least two fields the first address field defining the system identity of the required storage module or peripheral equipment and the second defining a location within the required storage module or peripheral equipment and in which each processing unit includes a bus interface unit which is conditioned with the system identity of a processing unit and the bus interface unit includes an identity address recognition arrangement activated by the presentation of an address including a field defining the system identity of a processing unit and the remainder of the presented address is used to select one of the internal registers of the processing unit.

In addition the remainder of the address according to a feature of the invention is used to select a bit pattern or a single bit in the selected internal register.

By such an arrangement the internal registers of a processing unit are accessed in an identical manner to the locations in the storage modules allowing the use of general purpose machine instructions such as LOAD, STORE and MOVE, to access the internal registers rather than providing special purpose instructions. This arrangement has particular significance when the data processing system incorporates information protection systems (using for example so-called capability registers) as the protection mechanisms can be extended to protect information held in the internal registers of the processing unit.

The invention together with its various features, should be more readily understood from the following description which should be read in conjunction with the accompanying drawings.

BRIEF DESCRIPTION OF THE DRAWINGS

FIG. 5 shows in tabular form, a typical internal mode address bit allocation whereas FIG. 6 shows in flow diagram form the operations performed in loading an internal register.

DESCRIPTION OF AN ILLUSTRATIVE EMBODIMENT

Figure 1:
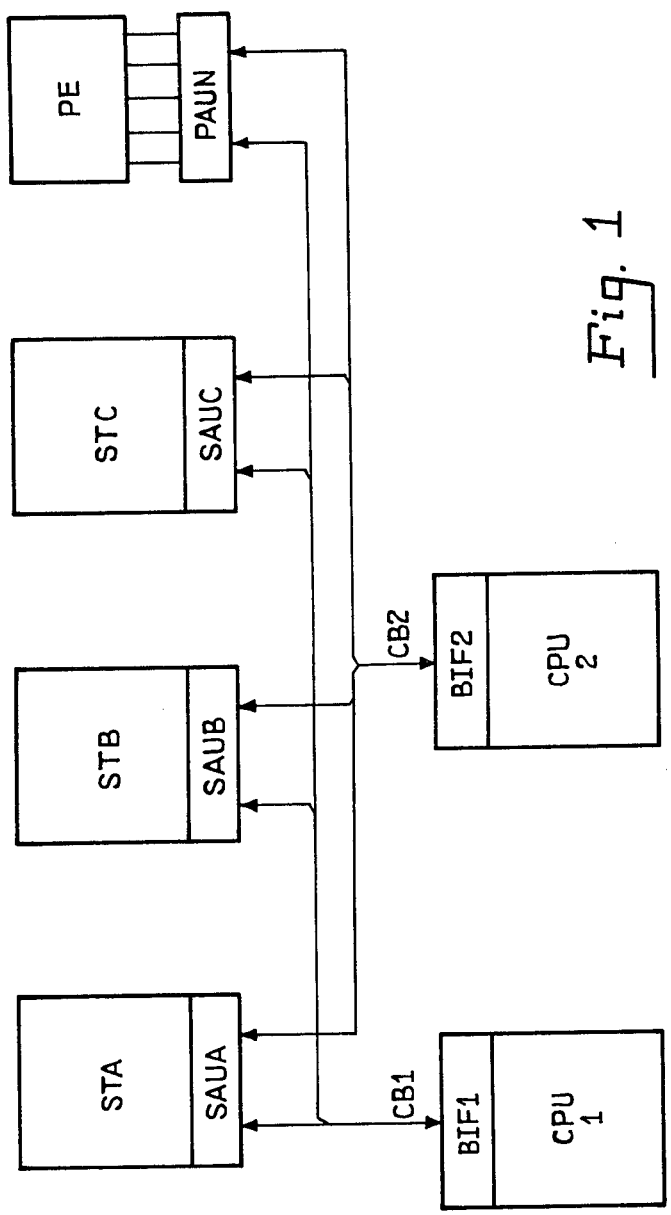
FIG. 1 shows in block diagram form a typical data processing system for use with the invention.

Considering firstly FIG. 1, it will be seen that a modular data processing system is shown including (i) a number of processing units CPU1 and CPU2, (ii) a number of storage modules STA, STB and STC and (iii) a group of peripheral equipments collectively shown as PE. Each storage module and each peripheral equipment is provided with an access unit SAUA, SAUB, SAUC and PAUN.

Each processing unit is provided with a discrete communication path or bus (CB1 and CB2 respectively for processing units CPU1 and CPU2). Each bus is terminated upon a separate port of all the access units (SAUA, SAUB, SAUC and PAUN).

All the access units are provided with the facility of recognising coded address information when applied to the buses terminated on their input port.

Figure 2:
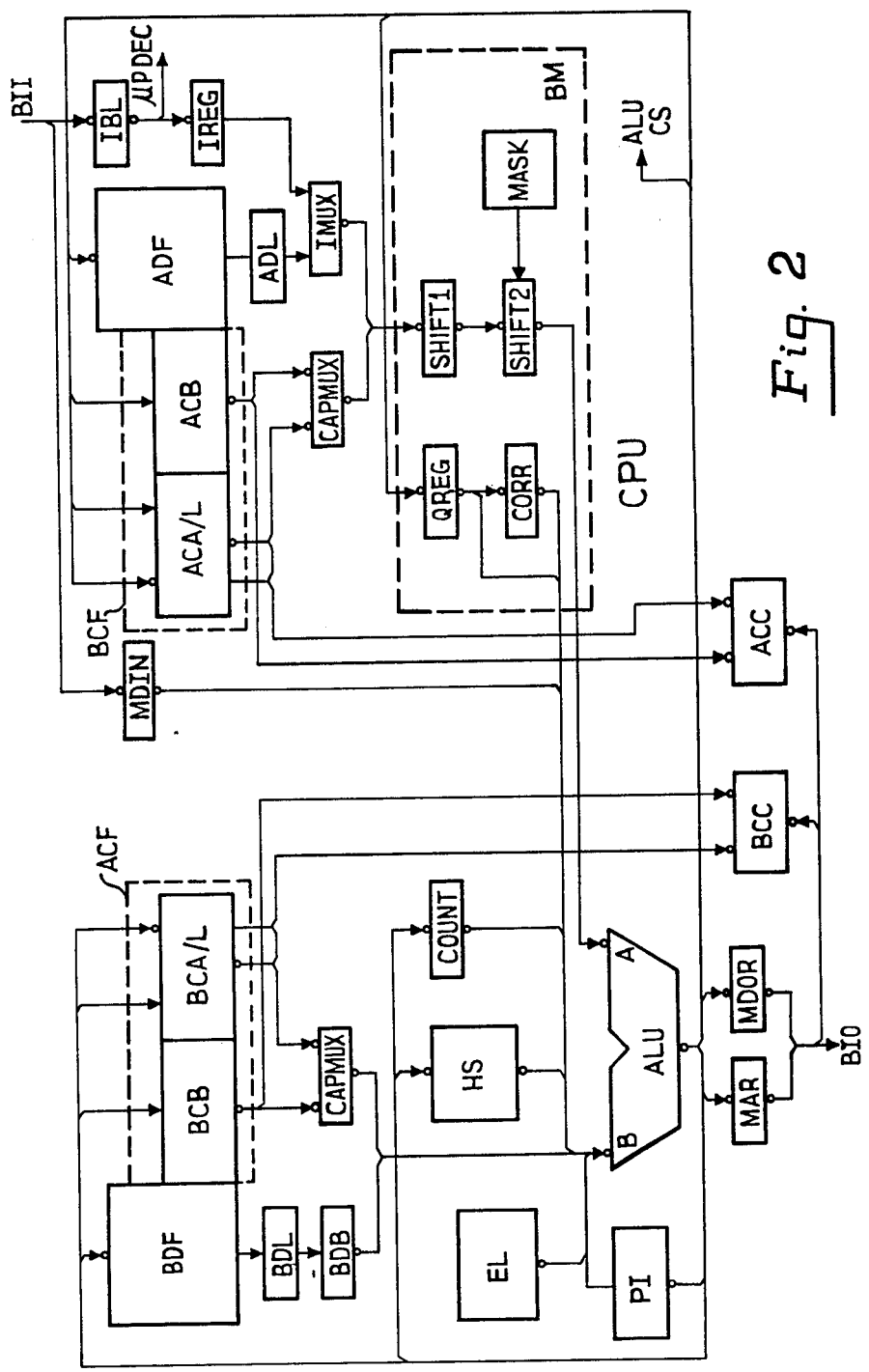
FIG. 2 shows, in block diagram form a processing unit suitable for use with the invention.
Figure 4:
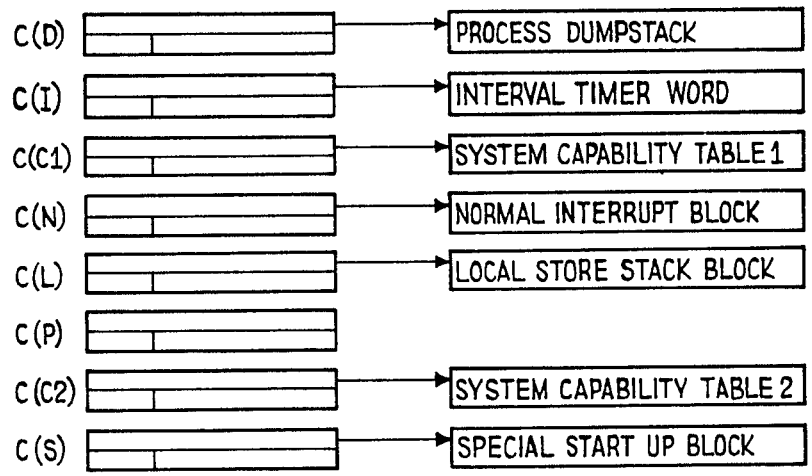
FIG. 4 shows the special purpose data and capability register provided in the CPU.

Considering now FIG. 2, each processing unit CPU includes an A data file ADF and a B data file BDF each including 32 locations together with A and B capability register files ACF and BCF. The capability registers are used to provide information protection arrangements of the type disclosed in B.P. Specification No. 1,329,721. The data files ADF and BDF provide duplicated register arrangements and each include eight general purpose data registers referred to as D(0) to D(7), in which all data manipulation is performed, together with a number of special purpose data registers which are shown in FIG. 4 and which are only accessible in internal mode. The capability register files ACF and BCF provide duplicated register arrangements and each include a number of general purpose capability registers together with a number of special purpose capability registers. The general purpose capability registers referred to as C(0) to C(7) are loaded with a descriptor comprising a base address, a limit address and an access rights code indicative of a block in the memory or a group of peripheral equipment registers. The capability register files ACF and BCF are shown segregated into a base section (ACB and BCB) and an access/limit section (ACA/L and BCA/L). The special purpose capability registers are only read and altered by programs having the capability of addressing in internal mode.

SPECIAL PURPOSE DATA REGISTERS

The special purpose Data Registers are listed below. As mentioned previously they are accessible in 'Internal Mode'.

1. Instruction Address Register (IAR)

This register contains the absolute address of the current instruction within the program block specified by the general purpose Capability Register C(7). It is altered by CALL, RETURN and LOAD CAPABILITY C(7) instructions and changed by a CHANGE PROCESS instruction.

2. Watch-Dog Timer Register (WTR)

This register is changed by a CHANGE PROCESS instruction, the old value being saved in the Process Dump-Stack of the suspended process; the new value is loaded from that of the activated process. It is decremented once every 100 $\mu$sec. If it reaches zero, a Fault Interrupt is caused. It therefore measures the total time each process is active.

3. Interrupt Accept Register (IR)

This register contains a single bit, bit 6, which is set when a Program Trap is accepted.

4. Process Dump-Stack Pushdown Register (PDSPR)

This register contains an absolute address pointer which defines the current top of the Process Dump Stack (i.e. it points to the first word in the area available for dumping). It is altered by the CALL RETURN instruction and changed by the CHANGE PROCESS instruction.

5. Fault Indicator Dump Register (FIDR)

Following the first Fault Interrupt, this register contains the state of the Fault Indicator Register.

6. Level Number Register (LNR)

This register is divided into two parts. The most significant 8 bits contain the current link level number of the process. It is altered by the CALL and RETURN instructions, and changed by the CHANGE PROCESS instruction. The least significant 16 bits of the register contains a relative address pointer.

7. Local Capability Count and Local Store Clear Count Register (LCCR)

The register is divided into two parts. The most significant 8 bits contain the count of the number of local capabilities created at the current link level. The least significant 16 bits of the register contain the local store clear count.

8. Data Registers D(A) and D(B)

These registers are not used by any of the functions of the processor, but can be accessed by data instructions using 'Internal Mode'.

All the Special Purpose Data Registers are 24 bits long, with the exception of the Interrupt Accept Register. All of them can be accessed by data instructions using 'Internal Mode' as well as being accessed by specific instructions.

SPECIAL PURPOSE CAPABILITY REGISTERS

There are eight special purpose Capability Registers, which are used by the processor unit to access control information. They can be read and altered by programs which have the capability of addressing in 'Internal Mode' since special loading instructions are not provided.

1. Capability Register C(D)

This register contains Base/Limit Addresses and Access code for the Processor Dump-Stack of the active process. It is changed by the CHANGE PROCESS instruction.

2. Capability Registers C(I)

This register defines a block of store the first word of which contains the Interval Timer value. It measures the absolute time elapsed and it is decremented once every 100 $\mu$sec by the Processor Unit. When it reaches zero, a Normal Interrupt is generated.

3. Capability Register C(C1)

This register defines a block of store containing the first part of the System Capability Table.

4. Capability Register C(C2)

This register defines a block of store containing the second part of the System Capability Table.

5. Capability Register C(N)

This register defines a block of store the first word of which contains a Capability Pointer which permits entry to the Normal Interrupt process.

6. Capability Register C(S)

This register defines a four word block of store which is used by the processor when dealing with Fault Interrupts. The 12 most significant bits of the Base word are incremented during the fault sequence, the remainder of the register being preset by the processor following power-up.

7. Capability Register C(L)

This register defines a block of store for the Local Store Stack of the current process. It is changed by the CHANGE PROCESS instruction.

8. Capability Register C(P)

This register is used by the Programmer Interface when accessing store.

INDICATOR REGISTERS

There are four Indicator Registers: Primary Indicator (PIR FIG. 2 and FIG. 4), Fault Indicator FIR, Test TR and Historical HR register. They indicate various conditions with the Processor. They are accessible in Internal Mode only. The contents of the Primary Indicator Register are changed by a CHANGE PROCESS instruction; the old value is saved in the Process Dump-Stack of the suspended process and then the new value is loaded from that of the activated process.

Primary Indicator Register (PIR)

The Primary Indicator Register is eight bits long.

Bits 0–2 are Arithmetic Indicators: EQUAL TO ZERO, (bit 0), LESS THAN ZERO, (bit 1), OVERFLOW, (bit 2). They are set or cleared by the result of the majority of instructions.

Bits 4 and 5 are Control Indicators.

DATA PARITY INDICATOR (bit 6) is set equal to the parity bit on the last data word read from the parallel bus, by Store Mode instructions that set the indicators.

Bit 7 is FIRST ATTEMPT Indicator. It is set by a Fault Interrupt and affects the Processor's response to subsequent faults.

Bit 8 is the INHIBIT INTERRUPTS Indicator. It inhibits timer interrupts from taking place when set.

Fault Indicator Register (FIR)

The Fault Indicator Register is 24 bits long.

Any bit may be set by an Internal Mode Access; any bit may be cleared. When set by the events described below, a Fault Interrupt occurs, excepting Processor/Store Interface Faults when INTERFACE FAULTS INHIBIT is set in the Primary Indicator Register.

Bits 0, 5, 9-11 and 14 indicate Processor/Store faults:

1. BUS CORRUPT (bit 0) is set if any of the input lines from the parallel bus have not returned to logic '0' within 400 μsec after a store access. This bit may only be set when INTERFACE FAULTS INHIBIT is set, i.e. it cannot cause an interrupt.

2. SLAVE TIMEOUT (bit 5) is set if a store module reports that address or data cannot be accepted by the module during a store access.

3. STORE INTERFACE TIMEOUT (bit 9) is set if a store module has not responded within 50 μsec.

4. PARITY COMPARISON FAULT (bit 10) is set if the parity generated by the store module on a forward-going word (i.e. 'address' or 'address/data') and returned to the CPU, is not equivalent to that generated by the processor.

5. READ DATA PARITY FAULT (bit 11) is set if the 'data/address' parity read from store is not equivalent to that generated by the processor on the address and data from store.

6. INVALID CONTROL CODE (bit 14) is set if a store module reports that it has received an invalid control code during a CPU/Store transfer. Three bit, odd parity codes are used.

Bit 2 is the INTERRUPT TIMEOUT Indicator. It is set if the Interrupt Accept Register has not been accessed, following the Interval Timer Word being decremented to zero (when INHIBIT INTERRUPTS is not set), for a period of 300 ms, or if this condition has not occurred 30 ms after a Fault Interrupt, (see Sect. 4).

Bits 6-8 and 18 indicate Capability faults:

1. CAPABILITY COMPARISON FAULT (bit 6) is set if the duplicated Base Address, Limit Address or Access Code within a Capability Register being used by an attempted access are found not to be identical.

2. CAPABILITY SUMCHECK FAULT (bit 7) is set if the Sumcheck word, circulated left by 9 bits, does not agree with the sum of Base and Limit values when a Capability Register is being loaded.

3. CAPABILITY BASE/LIMIT VIOLATION (bit 8) is set if an address is found to be outside the range specified by the Base and Limit Addresses of the Capability being used.

4. ACCESS FIELD VIOLATION (bit 18) is set if an illegal transfer is attempted (e.g. an attempted STORE DATA operation to a block whose Capability does not have the WRITE DATA bit set in the Access code).

5. CAPABILITY POINTER FAULT (bit 1) T.B.D.

Bit 12 is the INVALID OPERATION Indicator. It is set whenever an invalid operation is attempted. These are detailed as exceptions in Sect. 3.

Bit 13 is the POWER FAILURE Indicator. It is set if the power supply margins are exceeded.

Bit 15 is the TRAP FAULT Indicator. It is set if a Program Trap occurs while INHIBIT INTERRUPTS is set.

Bits 16 and 19 indicate Hardware Faults. HARDWARE FAULT 1 and HARDWARE FAULT 2 are set if certain internal hardware checks fail. These minimise the probability of hardware faults violating the Capability structures by checking the operation of those circuits concerned with Capability manipulation and store access.

Bit 17 is the WATCHDOG TIMER ZERO Indicator. It is set if the watchdog Timer Register reaches zero.

Bits 20-23 are set to the octal address of the Capability Register being used when a Fault or Trap occurs.

Bits 3 and 4 can only be set/reset by data instructions using 'Internal Mode'.

Test Register (TR)

This register contains control facilities for testing the fault detection mechanisms.

Historical Register (HR)

One register of a group of sixteen 26 bit registers is addressable at a time, by a 4 bit address counter. They constitute a First-In/First-Out circular queue.

The use of the above registers together with the bit multiplexer BM, the arithmetic unit ALU, the instruction register IREG, the memory address register MAR, the data in register MDIN and the data out register MDOR and the A and B Capability check comparators ACC and BCC all shown in FIG. 2 and will be more readily seen later with reference to the operation of the processor in so-called internal mode.

Internal Mode Operation General

Figure 3:
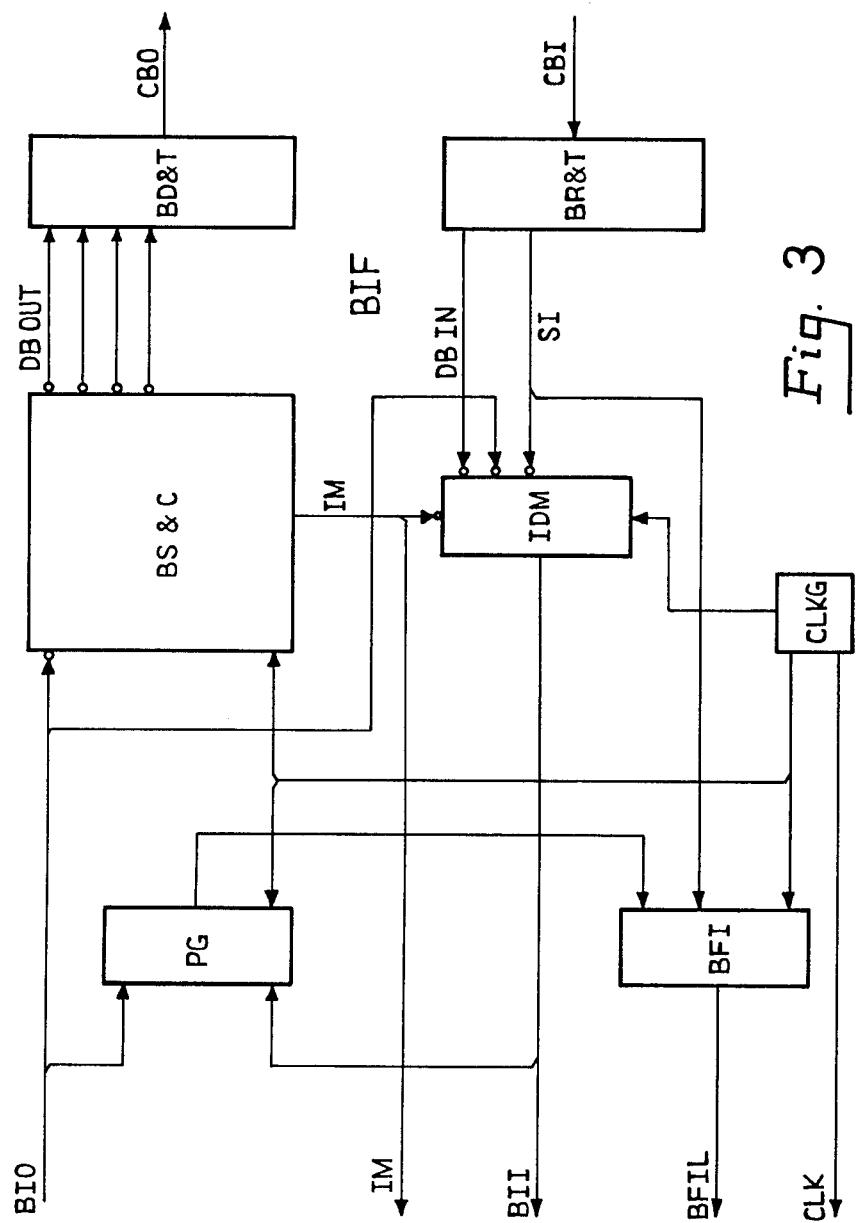
FIG. 3 shows, in block diagram form a bus interface unit for use in the invention.

The registers, internal to the processor unit, are allocated a module address which is programmed into the processor units bus interface BIF (FIG. 3). When this module address is specified in an address construction the processor module internally, in the bus interface unit, recognises the address and uses the remainder of the address word to access one of the internal registers. In this way internal registers are accessed in an identical manner to the accessing of locations in main store, both of which use the general purpose instruction set.

The accessing of a location in main store uses the address construction derived from the instruction which is divided into a Module Address, specifying the Main Store Module, and a Location Offset, specifying the word within the Main Store Module. When the Internal Registers Module is specified the remainder of the address construction specifies the Register Offset Address, and for some of the registers, the Bit Position Address. The Bit Position Address is only used for those registers containing individual bits with discrete functions. The Module Address and the Register Offset Address allow only one register to be specified, whereas each bit within the Bit Position Address corresponds to a bit within the register, allowing multiple bits to be specified.

The Bit Position Address selects a mask which is used when performing the operation on the register. If the Bit Position Address is zero then all the bits in the register can be accessed, whereas, if any bit is set in the Bit Position Address only the corresponding bit in the register can be accessed. When a single bit is specified in the Bit Position Address for a write operation then a defined mask is used to perform a logical AND operation on the data pattern specified by the instruction. The result of the logical AND and the contents of the specified register are used in logical INCLUSIVE OR operation and the result overwrites the original contents of the register. For a read operation the defined mask is used to perform a logical AND operation on the contents of the specified register. When multiple bits are set in the Bit Position Address then the masks defined by the individual bits are combined together by a logical OR operation to produce a composite mask.

By using the Bit Position Address to define a mask, or masks, the advantage of being able to group associated bits at contiguous addresses is gained.

Normally, 'active' Capabilities define Base and Limit Addresses of blocks of store. If the Module Number bits (the top eight bits of the Base Address) in a Capability Register are all ones and this Register is specified in an address construction, the least significant 12 bits of the second operand address are interpreted as specifying a Register within the Processor. No storage module can, therefore, use this Module Number.

As shown in FIG. 5, one bit set in bits 5-11 of the address a register or a group of registers; bits 1-4 specify one of the sixteen Data or Capability Registers when 5 or 6 is set. If bit 6 is set for the Capability Registers bit 0 selects the Base when reset and the Access/Limit when set. If bit 5 is set then resetting bit 0 selects the Data Registers and setting bit 0 selects the Pointer Registers. When bit 9 and bit 0 are set the Test Register is selected.

When the primary Indicator Register is selected access can be further restricted to specific control bits by use of bits 0-4 within the address. The allocation of the bits in the register to the address bits is given in table 3. If all the bits are zero the complete register can be accessed.

A Capability descriptor can either define all the registers in internal mode, a group of these registers, a single register, or a single bit, as in the case of the Primary Indicator Register.

The following restrictions apply to instructions which specify an Internal Mode Capability:

1. Only LOAD DATA, LOAD DATA MASKED, STORE DATA, STORE DATA MASKED, MOVE WORD and MOVE BYTE instructions are allowed. Any other will cause a fault Interrupt (Invalid Operation).

2. Capability Registers (except the Base of C(S)) can only be read. They are always loaded by Capability Manipulation instructions. A STORE DATA or STORE DATA MASKED instructions causes no change; no FAULT is generated.

3. Special purpose Capability Register C(S) has 12 alterable bits only (the most significant bits of the Base). All bits may be read.

4. If more than one of the bits 5-11 are set, no meaningful information is accessed.

To show how the equipment operates in internal mode the operations performed in performing a load data instruction will be described.

FIG. 6 shows the flow diagram and the basic instruction word IW for a "load" instruction. The instruction word comprises six fields defining (i) the ADDRESS, (ii) the Capability Register C(N), defining the block in which the offset address is to be used to provide the data source for the instruction, (iii) the data register to be used as an address modifier (M), (iv) the data register D(N) to be used to receive the data to be loaded, (v) the function code (FC), defining the load instruction, and (vi) the store mode flag (S).

The following description will be sectionalised under the steps of the flow diagram of FIG. 6 and for each step the way in which the processor unit operates will be defined.

STEP S1—Read In from Program Block

In the step the processor unit uses the C(7) capability register and the instruction address register to form the address of the next instruction in the program being performed. The so-formed address is fed into the address register MAR (FIG. 2) and the capability code comparators ACC and BCC check to see if the access is to be permitted. If it is the address is passed over highway BIO into the Bus Interface BIF (FIG. 3). The address is passed to the Bus sequence and control circuit BS & C and thence to the processor units output bus CBO using the Bus driver and terminator circuits BD & T. Eventually the store module holding the current program block will respond with the next instruction word (i.e. the load instruction) and this word is fed to the bus interface BIF over the input bus CBI. The word together with status information is passed over leads DBIN and SI respectively to the input data multiplexer IDM and the bus fault indicators BFI respectively by the Bus receivers and terminators BR & T. Under clock CLK control the incoming instruction word is passed over leads BII into the instruction buffer IBL in FIG. 2. The function code FC (see FIG. 6) is used to access the microprogram unit (not shown) of the processing unit whereas the address offset information ADDRESS is set into the instruction register IREG. Also other fields of the instruction word are used to condition the microprogram unit to control the operations of the instruction.

Step S2 FORM Required Address

In this step the microprogram unit causes the address offset in the IREG to be passed through the input multiplexer IMUX and the bit manipulator BM into the 'A' port of the arithmetic unit ALU while causing the base address of the capability register, defined by C(N) in the instruction word, to be passed from the base file BCB over the capability multiplexer CAPMUX into the 'B' port of the ALU. The ALU will then be conditioned to add and place the result in the address register MAR. As mentioned previously the internal mode is defined by the module address of the capability register used having an all 1's value. Accordingly after the capability bounds check performed by the comparator BCC has been performed the required address will be passed to the bus sequence and control circuit BS & C where the internal mode address will be detected and the address information will be looped back, by the input data multiplexer IDM, under the influence of the internal mode signal IM. The bus sequence and control circuit includes a detector arranged to generate the IM signal when the module address is all 1's. The internal mode signal IM is also passed to the microprogram unit (not shown) to condition that unit to perform the following data transfer sequence. In this sequence the symbol:=is used to indicate becomes.

BII:=BIO
MDIN:=BII
ALU:=MDIN
ALUCS:=ALU

In this way the address offset part of the address generated in step S2 is passed to the microprogram unit using the arithmetic unit condition signals ALUCS. This information is used to define the required "register" and the allocation of this information is shown in FIG. 5.

Step S3—Read at Formed Address

The microprogram unit now conditions the required register or bit or selection of bits in the data file or capability register file to be passed to the arithmetic unit ALU and thence to the data register D(N) defined by the instruction using the following sequence.
MDOR:=ALU
BIO:=MDOR
BII:=BIO Step S4—I/P Read Data into D(N)

In this step the data on the input bus BII is fed into the input register MDIN and thence through the ALU into the D(N) defined data register in both the A and B data files ADF and BDF.

From the above it can be seen that the described embodiment provides a mechanism for addressing any of a number of internal CPU registers or bits or bytes thereof treating them in an identical manner to addressing store locations. This has the particular advantage that it is not necessary to have special purpose register accessing instructions. Also the store protection system, embodied in the capability register structure, is extended to the internal registers since the capability descriptor incorporating the internal mode module address can define all or a sub-set of the internal registers.

What we claim is:

1. A data processing system including one or more processing units, a plurality of storage modules and a plurality of peripheral equipments, and each storage module and each peripheral equipment being provided with an access unit and each processing unit being provided with an associated unique data communication path which is connected to an individual port on each access unit, each access unit including means for storing a unique identity code indicative of the system identity of the associated art, each access unit further including an identity address recognition circuit which activates the access unit upon receipt of an associated identity code, a processing unit access operation involving a peripheral equipment or storage module location being performed by the processing unit associated with a communication path of the processing unit, an address comprising at least two fields, the first address filed defining the system identity of the required storage module or peripheral equipment and the second address field defining a location within the required storage module or peripheral equipment, wherein the improvement comprises in each processing unit a bus interface unit connected to a unique data communication path of each processing unit and an internal register selection means and said bus interface unit includes identity storing means for storing an identity code indicative of the processing unit and an identity address recognition means arranged to compare the first field of an address extended to the data communication path with said identity code stored in said identity storing means and upon detection of said identity code of the processing unit in the first field of an address extended to the data communication path, said identity address recognition means being connected to the second field of the presented address to the internal register selection means so that a selected internal register can be used as the location for a processing unit access operation.

2. A data processing system according to claim 1 in which the bus interface unit includes means for identifying a system address identity comprising a module number of all ones.

3. A data processing system according to claim 1 or 2 in which the processing unit includes means for selecting a sub-set of the register contents defined by the second field and each address includes a third field to define a bit position address to define the required sub-set.

4. A data processing system according to claim 3 in which the bit portion address is used to define a mask or masks to select the bits of the selected register to be subjected to the required operation.

* * * * *